June 30, 1925.  1,543,690
E. ASHWORTH
MOTOR FOR GATHERING REELS
Filed July 13, 1923
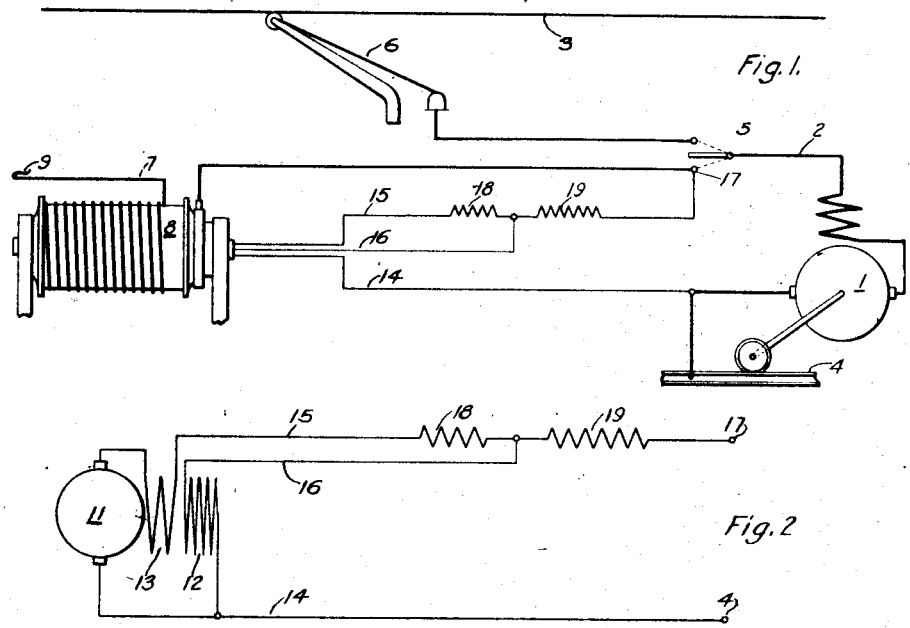
Fig. 1.
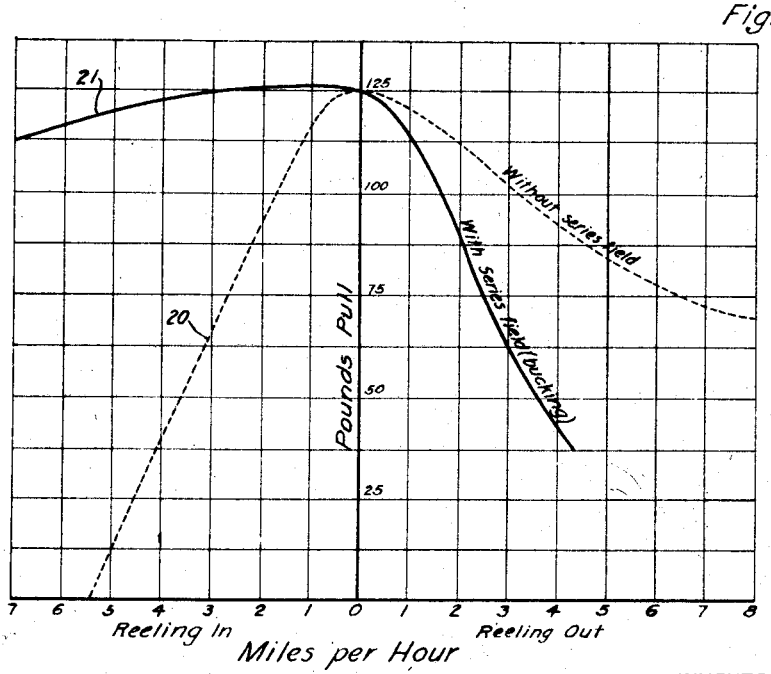
Fig. 2.
Fig. 3.
Reeling In  Reeling Out
Miles per Hour
WITNESSES:
INVENTOR
Everett Ashworth
BY
ATTORNEY Patented June 30, 1925.

1,543,690

UNITED STATES PATENT OFFICE.

EVERETT ASHWORTH, OF NEW YORK, N. Y., ASSIGNOR TO WESTINGHOUSE ELECTRIC & MANUFACTURING COMPANY, A CORPORATION OF PENNSYLVANIA.

MOTOR FOR GATHERING REELS.

Application filed July 13, 1923. Serial No. 651,210.

*To all whom it may concern:*

Be it known that I, EVERETT ASHWORTH, a citizen of the United States, and a resident of New York, in the county of Bronx and State of New York, have invented a new and useful Improvement in Motors for Gathering Reels, of which the following is a specification.

My invention relates to gathering reels and has special reference to electrically driven gathering reels for mining locomotives.

It is often necessary to operate mining locomotives over which no trolley wire has been extended. For this purpose a conductor cable is provided and wound over a motor-operated drum mounted upon the locomotive. By connecting the cable terminal to a trolley wire, or other supply line, the operation of the locomotive is made independent of the trolley wire and is limited only by the length of the cable wound upon the drum. During such operation, it is important that no loose cable shall lie upon the track, liable to be damaged by the wheels of the locomotive or otherwise. To this end means are provided whereby the cable is always kept gathered on the reel, independently of the movement of the locomotive.

In U. S. Patent 1,206,309, granted November 28, 1916 to Joseph Le Conte Davis and assigned to the Westinghouse Electric and Manufacturing Company is shown an electric motor designed for operating a gathering reel, and the desired torque characteristic of such a motor is stated. The above-mentioned motor was well adapted to meet the requirements of mining locomotives for limited speed service. It is particularly important, however, that when the reel is gathering in the cable, that is, when the locomotive is advancing, sufficient torque shall be provided to keep the cable taut and to prevent the wheels from going over the cable, notwithstanding the high operating speeds which obtain in modern locomotive operation and which are substantially in excess of the speed of the older locomotives.

Accordingly, the general object of my invention is to provide an improved motor which is capable of delivering a substantially uniform gathering torque during the entire speed-range of advancing of modern locomotives. I achieve this object by providing, in addition to the shunt field winding used on the motor of the old type, a series field winding in bucking relation to the shunt field winding.

The novel features of my invention will be best understood by reference to the accompanying drawings, wherein Figure 1 is a diagrammatic view showing the electrical connections of a mining locomotive equipped with a motor-operated gathering reel.

Fig. 2 is a similar view showing the motor for operating the gathering reel of Fig. 1 and embodying my invention.

Fig. 3 is an explanatory curve diagram referred to hereinafter.

Referring to Fig. 1, the main driving motor or motors 1 of a locomotive are arranged to be supplied, by means of a circuit 2, from a trolley wire 3 and a return conductor 4 of a direct-current source (not shown). By means of a switch 5, the supply wire 2 may be connected to a trolley 6 for ordinary operation or to a conductor cable 7 for operation over parts of the tracks which are not provided with a trolley wire. The conductor cable is wound upon a reel or drum 8 and has a hook-terminal 9 for connection with the trolley wire.

The reel or drum 8 is operated by a motor illustrated in Fig. 2 and built into the drum. The motor comprises a direct-current armature 11, a series field winding 13 and a shunt field winding 12 arranged to be bucked by the series field winding. The main motor circuit comprising the armature 11 and the series field winding 13 has terminal conductors 14 and 15, respectively. The shunt field winding 12 is connected at one end to the terminal conductor 14 and is provided at the other end with an additional terminal conductor 16. The terminal conductor 14 is directly connected to the return conductor 4, and the terminal conductor 15 is connected to the cable 7 and one of the stationary contact points 17 of the switch 5 through an "internal" resistor or resistor-section 18, which is individual to the armature circuit, and an "external" resistor or resistor-section 19, which is traversed by the total current flowing through both the armature 11 and the shunt field winding 12, the shunt-field terminal conductor 16 being connected between the resistors 18 and 19. In the preferred embodiments of my invention, the external resistor portion 19 is larger than the internal resistor portion 18, thus causing the total current supplied to the motor to be relatively constant, considering the wide speed range.

The operating characteristics of the motor and their desirability in reeling service will be best understood and recognized from the curves in Fig. 3. Dotted-line curve 20 represents the torque at the armature shaft, as a function of the locomotive speed, for a motor constructed according to above mentioned Patent 1,206,309. Full-line curve 21 illustrates the torque of a motor embodying my invention. The torque curve of the old-type motor shows a hump extending over a relatively small speed range. This range of maximum torque may be shifted to a limited extent by proper choice of the resistors 18 and 19, but it has been found that, with a motor of given size, a satisfactory gathering torque is not obtainable at locomotive speeds exceeding four miles per hour.

Through the use of a motor constructed according to my invention, the above mentioned hump is extended over a wider range of speeds in the advancing direction, so that the motor torque is maintained substantially constant during the entire gathering or reeling-in period. The apparent disadvantage of rapidly falling torque when paying out the cable is of no harmful consequences, by reason of the fact that the friction torque will in most cases be sufficient to keep the cable taut during such period.

The improved torque characteristic is obtained through the balancing of the armature current and exciting field effected by the bucking series field winding. At standstill, the motor has a certain definite torque which is a product of the armature current and the resultant field of the two windings 12 and 13 acting in opposition to each other. With the locomotive advancing, the reel gathers in and the motor turns in the direction of its torque; a counter electromotive force is set up in the armature, reducing the armature current, but also reducing the bucking effect of the series field winding. The change of the armature current is thus brought in inverse relation to the increase in the field strength, and the torque is maintained at a substantially constant value.

My invention is not restricted to the particular use in mining locomotives as described above. It is equally applicable in traction-rope reels, haulage reels and generally in all applications requiring a torque motor of a similar character.

It is further obvious that various details of construction described above may be changed without departing from the spirit of my invention, I desire, therefore, that only such limitations shall be imposed thereon as are indicated in the appended claims.

I claim as my invention:

1. A motor for a gathering reel comprising an armature, a series field winding and a resistor connected in series relation across a source of electric energy, and a second field winding acting in opposition to said series field winding and connected in parallel relation to the part of the circuit comprising said armature and a predetermined portion of said resistor.

2. In combination with a direct-current motor associated mechanically with a movable body, of a load turning the motor armature against its torque during one part of the movement and being operated by said armature during another part of the movement, said motor comprising an armature, a field winding and a resistor connected in series relation and a second field winding connected in shunt relation to the portion of the circuit comprising said armature, series field winding and a portion of said resistor, said series field winding being arranged to buck the action of said shunt field winding.

3. In an electric vehicle a supply cable connected to a source of electrical energy, a gathering reel for said cable, an electric motor actuating said reel and adapted to exercise an approximately constant torque upon said cable while reeling in, and a torque decreasing with the speed of unreeling while paying out said cable, said motor comprising an armature, a bucking field winding and a resistor connected in series to said source of energy, and a main field winding connected in shunt to the portion of the circuit composed of the armature, the bucking field winding and a part of said resistor.

4. The combination with a cable and a gathering reel therefor, of an electric motor for continuously exerting a unidirectional torque upon said reel and having an armature upon which a predetermined load-varying voltage is impressed, a shunt field winding upon which a differing voltage is impressed, and a bucking series field winding in series relation to said armature.

5. The combination with a cable and a gathering reel therefor, of an electric motor for continuously exerting a pull on said cable in one direction and having an armature, a resistor in series therewith, a field magnet winding in shunt circuit relation to the armature and a portion of the resistor, and a bucking series field winding in series relation to said armature.

6. The combination with an electric motor for producing a unidirectional torque and having an armature, a resistor in series therewith, a shunt field winding in shunt circuit relation to the armature and a portion of the resistor, and a bucking series field winding in series relation to said armature, of a mechanical load adapted to act upon said motor to turn said armature against the motor torque and to be acted upon by said motor during its normal operation, said motor and said load being adapted for relative bodily movement.

7. The combination with a source of energy, of an electric motor mounted upon a forwardly and backwardly movable body and comprising an armature, a resistor connected in series relation therewith, a shunt field winding permanently connected across the armature and a predetermined portion of said resistor and a bucking series field winding in series relation to said armature, whereby the voltage of said source is apportioned to produce an approximately constant resultant motor torque during forward speed, of a mechanical load that is acted upon by said motor during its forward movement and acts upon said motor to produce rotative movements thereof when the motor is moved in a backward direction.

8. In combination, a commutator motor and a load, said motor exerting a unidirectional torque and said load turning said motor at full and intermediate speeds against its torque during one part of the movement and being operated by said motor at full and intermediate speeds during another part of the movement, said motor having an armature circuit comprising an armature, a series field winding and a permanently connected impedance device, a shunt field winding energized in parallel relation to said circuit, said series winding being in bucking relation to said shunt winding, and a second impedance device in series relation to both the armature and shunt field circuits.

9. In combination, a commutator motor and a load, said motor exerting a unidirectional torque and said load turning said motor at full and intermediate speeds against its torque during one part of the movement and being operated by said motor at full and intermediate speeds during another part of the movement, said motor having an armature circuit comprising an armature, a series field winding and a permanently connected resistance device, a shunt field winding and a second resistance device in series relation to both the armature and shunt field circuits, said resistances being of such values that the motor is operable in both directions without overheating and with a relatively high motoring torque when running at high speed in the forward direction.

10. The combination with a source of approximately constant current, of an electrical motor associated therewith, and a load turning said motor at full and intermediate speeds against its torque during one part of the movement and being operated by said motor at full and intermediate speeds during another part of the movement, said motor having an armature circuit comprising an armature and a serially connected impedance device connected across said source, a parallel circuit comprising means for producing a shunt exciting field in said motor, and means in series circuit relation to said armature for producing a bucking exciting field in said motor.

In testimony whereof, I have hereunto subscribed my name this 9th day of June, 1923.

EVERETT ASHWORTH.